Sept. 26, 1961 A. FRÖBEL 3,001,701

COUNTER MECHANISM FOR SHORTENED MULTIPLICATION

Filed Sept. 26, 1958 2 Sheets-Sheet 1

INVENTOR

Artur Fröbel by: Michael S. Striker

Attorney

COUNTER MECHANISM FOR SHORTENED MULTIPLICATION

Filed Sept. 26, 1958 2 Sheets-Sheet 2

INVENTOR
Arthur Fröbel
by:
Michael S. Striker
Attorney 3,001,701
Patented Sept. 26, 1961

3,001,701

COUNTER MECHANISM FOR SHORTENED MULTIPLICATION

Artur Fröbel, Oberndorf (Neckar), Germany, assignor to Firma Olympia Werke A.G., Wilhelmshaven, Germany Filed Sept. 26, 1958, Ser. No. 763,577
Claims priority, application Germany Sept. 27, 1957
14 Claims. (Cl. 235—63)

The present invention relates to a mechanism for short-cut multiplication, and more particularly to a mechanism which produces a tens-transfer from each order in which a registered digit exceeds a median digit.

Devices of this type are known, but in accordance with the prior art, each counter wheel is shifted while the respective controlling counter wheel of the next lower order passes from nine to zero position.

The counters of the prior art have the disadvantage that multiplications have to be carried out starting from the lowest order, which is in a direction opposite to the direction of operation during a division.

It is one object of the present invention to overcome this disadvantage of the prior art, and to provide a mechanism for short-cut multiplication which can be operated starting from the highest order of the multiplier.

It is another object of the present invention to provide a mechanism for short-cut multiplication in which the tens transfer is preset by displacement of a transfer member provided between the elements of consecutive orders.

Another object of the present invention is the provision of a mechanism for short-cut multiplication in which all parts can be mounted on a single slide.

Another object of the present invention is a device for short-cut multiplication which reliably operates and is constructed of few and inexpensive parts.

Standard calculating machines effect a multiplication by repeated additions of the multiplicand which is introduced into a totalizer a number of times corresponding to the multiplier. For example, if the multiplier is 28, it is necessary to perform eight additions in the unit order, and two additions in the second order so that altogether ten additive operations have to be carried out.

In a short-cut multiplication, the multiplier 28 is transformed into 30 minus 2 so that in the unit order, two subtractive operations are effected, and in the second order three additive operations are effected, resulting in five necessary operations.

It is consequently an object of the present invention to provide a mechanism which, upon introduction of the multiplier, is automatically reset to represent the multiplier in the form required for a short-cut multiplication. In other words, in all orders in which a digit greater than five is introduced, a subtractive operation is preset, while at the same time the next higher order of the mechanism is set to represent the introduced digit augmented by a unit.

With these objects in view, the present invention mainly consists in a mechanism for short-cut multiplication which comprises a denominational series of digital counter means which are moved by input means between a zero position and a plurality of digital positions for representing introduced multiplier digits, and which are also moved for counting the number of additions required for a multiplication; and a denominational series of control and transfer means controlled by each counter means to stop the counter means of the respective next higher order in zero position, or in a transfer position following the zero position, respectively, when the respective controlling counter means is in a position representing a lower digit, or a higher digit, respectively, with reference to a selected median digit. In this manner, the introduced digit augmented by a unit is counted in any order whose next lower order represents a digit greater than the median digit. The control and transfer means effect turning of the counter means when the respective counter means represents an introduced digit greater than the median digit so that a complement number of steps is counted, and also effect turning in opposite direction of each counter means in which a lower digit than the median digit is represented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
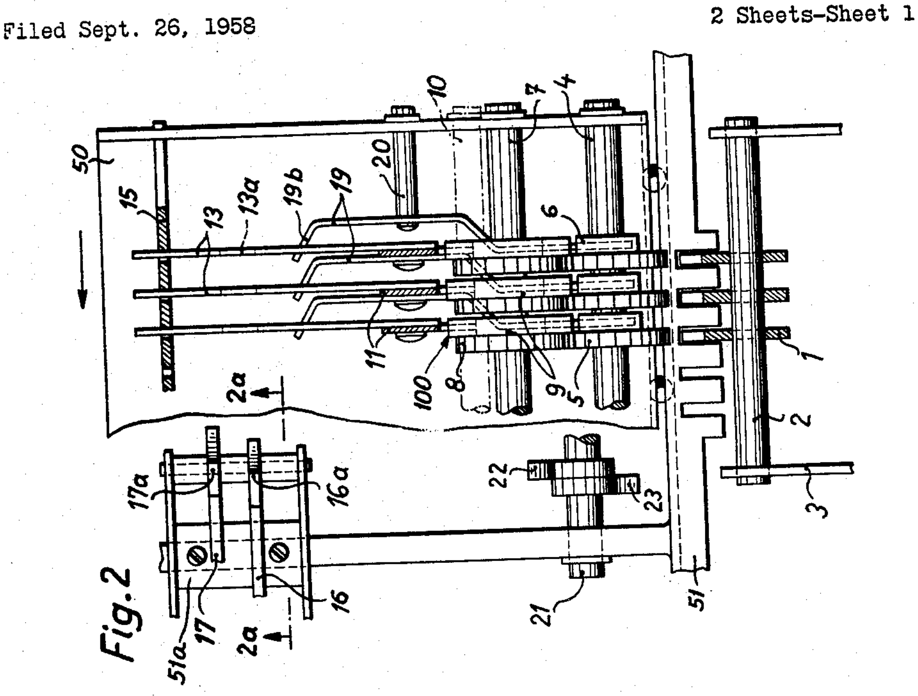
FIGURE 2 is a front view of the mechanism, partly in section taken on line 2—2 in FIGURE 1.
Figures 1, 2A:
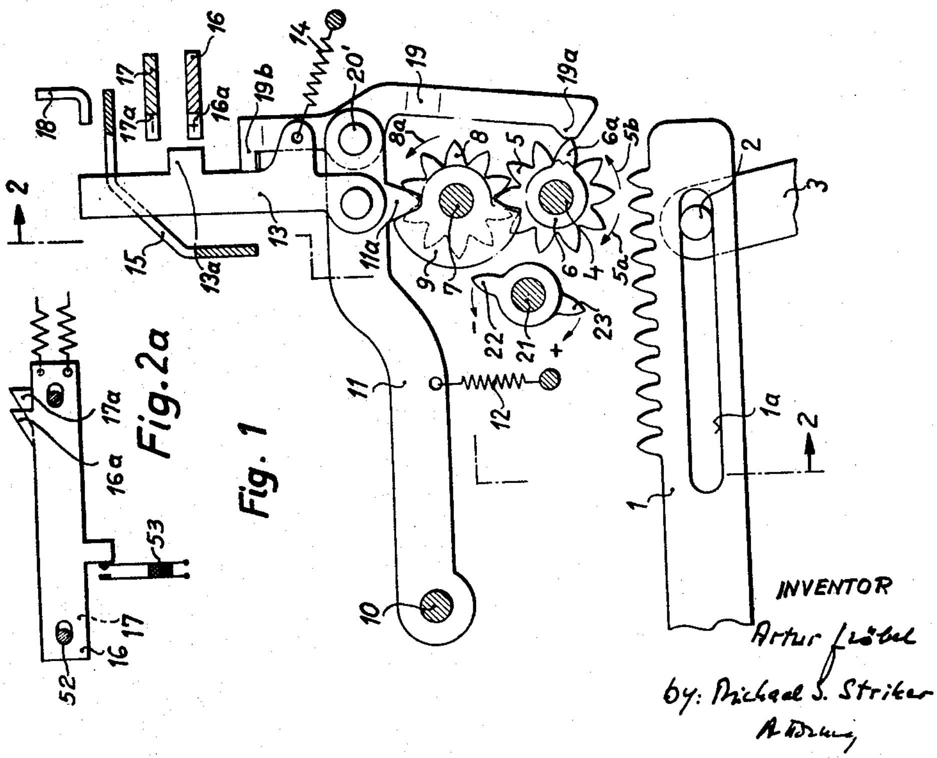
FIGURE 1 is a fragmentary side view of a mechanism according to the present invention.
Figure 4:
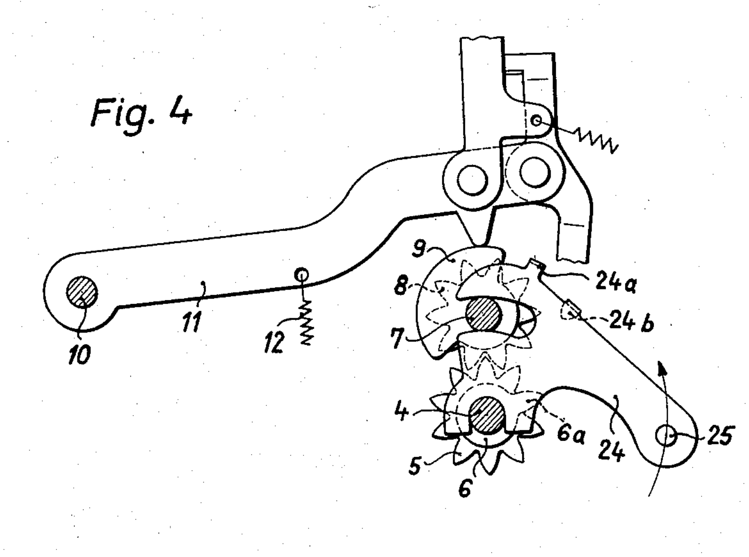
Figure 3:
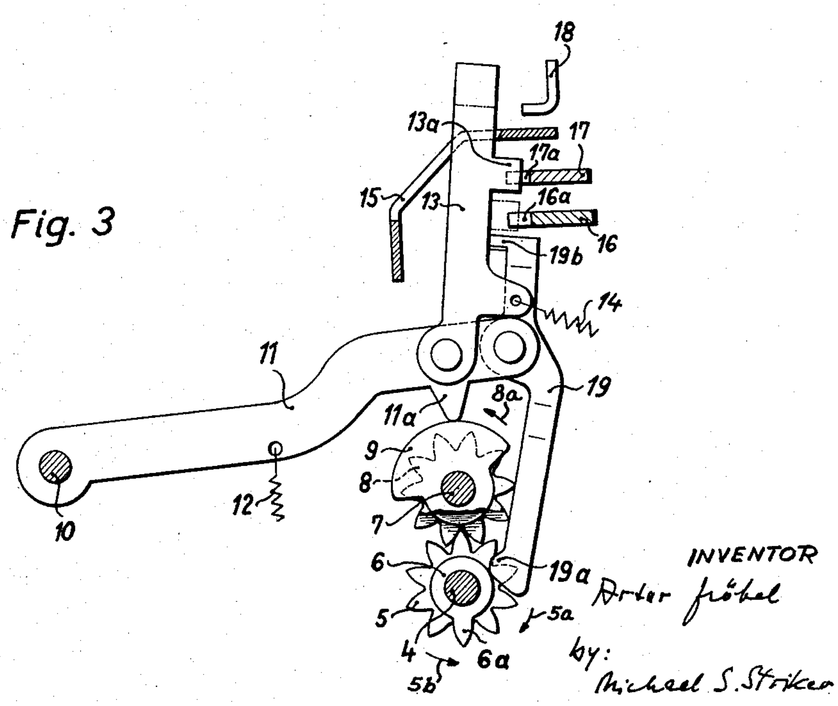

FIGURE 2*a* is a fragmentary view taken on line 2*a*—2*a* in FIGURE 2;

FIGURE 3 is a fragmentary side view of the mechanism illustrating another operational position; and FIGURE 4 is a fragmentary side view of a detail of the mechanism illustrating means for clearing the counter.

Referring now to the drawings, and more particularly to FIGURES 1 and 2 the mechanism 100 is mounted on a slide 50 which is movable along the machine frame 51, and is urged by spring means to move to the left as viewed in FIGURE 2. The mechanism comprises a denominational series of elements, three of which are shown in FIGURE 2 for the three lowest decimal orders.

A counter means is provided in each order which includes a gear 5 to which an actuating member 6 having a lug **6*a* is secured for rotation therewith. The multiplier digits are introduced into the counter means by input means comprising a rack bar 1 having a slot 1*a* in which a pin 2 of a rocking lever 3 is guided. By operation of lever 3, rack bar 1 can be raised into a position meshing with the associated counter gear 5 for turning the same in direction of the arrow 5*a* until the gear 5, and the associated actuating lug 6*a* has turned a number of steps corresponding to the introduced digit, and has moved from the illustrated zero position to the respective digital position. The input means are mounted on the machine frame and rack bars 1 are guided in slots of frame part 51. Each gear 5 meshes with another gear 8 to which a cam means 9 is fixedly secured for rotation therewith. Cam 9** has a smaller semi-circular cam track portion associated with the digits from zero to five, and a semi-circular cam track portion of greater radius for the digits from six to nine.

Gear 8 and cam 9 are mounted on a shaft 7 and are part of control means which include a control member 11 having a cam follower portion **11*a* cooperating with cam 9, and a second control member 13 which is pivotally mounted on control member 11. A spring 14 is fixed to the slide 50 and connected to control member 13 to urge the same to turn in clockwise direction. Control member 31 is also movable together with control member 11 between the position illustrated in FIG. 1 and associated with additive operations, and a raised position shown in FIG. 3 and associated with subtractive operations, as will be explained hereinafter. A spring 12 is secured to control member 11 and urges the control means into a position in which cam follower 11*a* engages the cam track of cam 9. It is evident that turning of the cam means 9 in clockwise direction out of the position of FIG. 1 will effect raising of the control means 11 and 13 from the addition position to the raised subtraction position. Control members 13 are guided in a comb-like guide 15 for turning movement between the position of FIG. 1 and a position shown in FIG. 3 in which the projection 13***a* engages either stop 16*a*, or stop 17*a* depending on whether control member 13 is in the lower addition position, or in the raised subtraction position. Stops 16*a* and 17*a* are provided on stop members 16 and 17 which are secured to the machine frame portion 51*a* and successively cooperate with the control member 13 of each denominational order during movement of the counter slide 50 to the left, as viewed in FIG. 2. Stops 16*a* and 17*a* are staggered in direction of the movement of the slide 51 and of the control members 13, so that the slide and the denominational series of elements mounted thereon will be stopped in different positions depending on whether the respective control member 13 is in addition position or in subtraction position. It will be understood that stop means 16*a* and 17*a* are common to all denominational orders of the counter mechanism.

FIGURE 2*a* illustrates the stop members 16 and 17 in greater detail. Stop members 16 and 17 are mounted on fixed pins 52 for movement in the direction of the movement of slide 50 and of mechanism 100, and when control members 13 of successive denominational orders engage stop 16*a* or 17*a*, respectively, of stop bar 16 or 17, the respective stop bar is slightly displaced for operating a switch 53 as will be explained hereinafter.

A locking member 18 is mounted in the machine frame and is turnable to a position locking all control members 13 in the illustrated position whereby the short-cut multiplication mechanism 100 is rendered inoperative as is desired during a division.

Each first control member 11 turnably supports on a pin 201 a transfer member 19 which cooperates with control member 13 of the next higher denominational order, as can be best seen in FIGURE 2. The end portions 19*a* and 19*b* of each transfer member are transversely bent to respectively abut the control member 13 and the actuating member 6, 6*a* of the next higher order. During the following description, it will be assumed that the denominational set of transfer means 19 is respectively associated with the same denominational order as the control member 13 and counter means 6, 6*a* engaged by its end portions, and is controlled by the control member 11 of the respective next lower order, or in other words that each control member 11 controls the transfer means 19 of the next higher order.

In the position shown in FIG. 1, the end portion 19*a* of a transfer member 19 abuts against the lug 6*a* of actuating member 6 so that transfer member 19 cannot turn about its pivot point under the action of spring 14 which urges control member 13 against end portion 19*b*. This is the zero position of the counter means 5, 6 in which control member 13 is in its second position in which it cannot engage one of the stops 16*a* and 17*a*. Members 13 and 6 of the lowest order, shown on the right of FIGURE 2, also cooperate with an associated transfer member 19, but the respective transfer member 19 of the lowest order is mounted on a pin 20 on the slide, since no transfer to the unit order is possible.

It is evident that turning of counter means 5, 6 out of the position illustrated in FIG. 1, will release the respective associated transfer member 19 to turn under the action of spring 14 together with control member 13 into a position in which portion 19*a* engages the hub of actuating member 6, as shown in FIGURE 3. At the same time projection 13*a* will be displaced to the above-described position in which it may engage one of the stops 16*a* and 17*a*.

On a shaft means 21, first and second drive members 22 and 23 are mounted which during an operational cycle rotate in opposite directions as indicated by the arrows. Drive member 22 is associated with subtraction, and drive member 23 is associated with addition, as will be explained hereinafter in detail. Drive members 22 and 23 are spaced in axial direction the same distance as the stops 16*a* and 17*a*. If the control member 13, 13*a* of any order in its lower addition position engages the stop 16*a*, the respective associated counter gear 5 is located opposite drive member 23, and is turned one step by the same in the direction of arrow 5*b* during each single revolution of drive member 23. If the respective control member 13 was in its raised subtraction position, and engages stop means 17*a* during movement of the slide to the left as viewed in FIGURE 2, the slide is not stopped in the addition position thereof determined by stop means 16*a*, but is stopped in a subtraction position determined by the stop 17*a* in which the drive member 22 is located opposite the respective counter gear 5 and turns the counter gear 5 and associated actuating member 6 in the opposite direction illustrated by the arrow 5*a*.

Each denominational order above the unit order is provided with clearing means as illustrated in FIGURE 4. A clearing lever 24 is rockably mounted on shaft 4 of the counter means, and has a slot by which the clearing lever 24 is guided on shaft 7 while it turns about shaft 4. A rod 25 passes through all clearing levers 24, and is actuated after termination of a multiplication to turn all clearing levels 24 in counterclockwise direction as viewed in FIGURE 4. A projection 24*a* on each clearing lever engages cam 9, and a projection 24*b* engages gear 8 when the clearing levers 24 are turned, so that all counter means 5 and cams 9 are turned back to the zero position illustrated in FIGURE 1. During such movement, each lug 6*a* turns the respective associated transfer member 19 from the position illustrated in FIGURE 3 to the position illustrated in FIGURE 1 whereby the respective associated control member 13 is also returned to the position illustrated in FIGURE 1 against the action of spring 14.

The above described mechanism operates in the following manner;

It is assumed that a multiplicand is to be multiplied by the multiplier 281 starting with the highest decimal order. This would require two additive operations in the third order, eight additive operations in the second order, and one additive operation in the first order during a regular multiplication operation. In the shortened multiplication carried out by the mechanism of the present invention, three additive operations are performed in the third order, two subtractive operations are performed in the second order, and one additive operation is performed in the first order. In accordance with the present invention, the subtractive operations are carried out by addition of complement numbers.

The counter means 5, 6 in the third order are engaged by input bar 1 and are turned two steps in forward clockwise direction as indicated by the arrow 5*a*. Gear 5 turns gear 8 a corresponding number of steps in counterclockwise direction as indicated by the arrow 8*a*, so that cam follower 11*a* remains on the smaller cam portion of cam 9. Control member 11 remains in its normal position illustrated in FIGURE 1, and control member 13 remains in its lower addition position in which projection 13*a* is located at the level of stop 16*a*.

However, since actuating lug 6*a* has been displaced, the respective transfer member 19 of the third order and associated control member 13 are turned by spring 14 in clockwise direction.

Counter means 5, 6 and transfer member 19 associated with the third decimal order are shown in FIGURE 3 in solid lines in the above described position. Control means 8, 9, 11 and 13 are shown in solid lines for the next lower decimal order. The projection 13*a* of the third decimal order is shown in dash and dot lines in FIGURE 3. As explained above, projection 13*a* of control member 13 associated with the third order is located at the level of stop means 16*a*, and since the respective transfer member 19 has turned in clockwise direction, projection 13*a*, shown in dash and dot lines in FIGURE 3, cooperates with the stop means 16*a*.

The transfer member 19 of the third decimal order is mounted on control member 11 and controlled by the control means 8, 9, 11 of the next lower second order, shown in solid lines in FIGURE 3, in which the digit 8 was introduced by the respective input means 1.

Consequently, the counter means 5, 6 of the second order was turned through eight steps in clockwise direction as indicated by arrow 5*a* so that the associated control gear 8 was turned in counterclockwise direction as indicated by arrow 8*a* through eight steps resulting in the position shown in FIGURE 3 in which cam follower 11*a* of the respective second decimal order engages the dwell portion of the respective control cam 9 of the second order. Control members 11 and 13 of the second order are consequently in raised subtraction position in which projection 13*a* is located at the level of the stop means 17*a* associated with subtraction. Since control member 11 of the second order is raised by cam 9 from its normal position to a raised control position, the transfer member 19 supported thereon, and associated with the next higher third order was also raised from its normal position to a transfer position shown in FIGURE 3. The movement of end portion 19*a* is in direction of movement of actuating lug 6*a*, or more particularly in substantially circumferential direction with respect to the counter means 5, 6. End portion 19*a* of member 19 in transfer position is retracted one step in the direction of arrow 5*b* so that lug 6*a* will not engage end portion 19*a* when counter means 5, 6 is returned in counterclockwise return direction to the initial zero position of FIG. 1, but will engage end portion 19*a* one step later.

Counter means 5, 6 of the unit order is turned by the input means 1 a single step in forward clockwise direction to represent a unit in the first decimal order.

The slide 50 which supports the mechanism 100 is now released for starting the multiplication, and moves under the action of a spring to the left as viewed in FIGURE 2. The multiplication starts with the highest order, and when control member 13 of the third order arrives in the region of the stops 16*a* and 17*a*, slide 50 is stopped by the stop 16*a* which is associated with addition, since control member 13 of the third order is in its lower addition position indicated by dash and dot lines in FIGURE 3.

When the mechanism is stopped by stop 16*a* in addition position, drive member 23 is located opposite the counter gear 5 of the third order. Every time drive member 23 performs a revolution in clockwise direction, counter gear 5 of the third order is turned one step in the return direction indicated by arrow 5*b*. The counter means 5, 6 and actuating lug 6*a* reach zero position after two steps, but since the respective associated transfer means 19*a* was displaced to a raised transfer position as illustrated in FIGURE 3, a third step is required before lug 6*a* engages end portion 19*a* and turns transfer member 19 in counterclockwise direction so that control member 13 of the third decimal order is also turned to its second releasing position in which projection 13*a* is retracted from the stop means 16*a*. Consequently the mechanism is released, and the slide travels on to the next following position in which control member 13 of the second decimal order is operative to stop slide 50 with mechanism 100. During such movement of the mechanism, the drive member 23 is separated from the counter gear 5 of the third decimal order, and cannot turn the same after lug 6*a* has actuated the associated transfer member 19.

The totalizer in which the product is formed by repeated addition of the multiplicand is not shown in the drawings. However, it will be understood that the multiplicand digit was added in the third decimal order a number of times corresponding to the steps performed by the counter means 5, 6 in the third order, that is three times. Consequently a multiplication by three has been performed in the calculating machine, as is desired for a shortened multiplication.

The stop bars 16*a* and 17*a* are displaceable in direction of the movement of the counter mechanism to a slightly displaced position. When projection 13*a* engages one of the stop means 16*a* or 17*a*, the respective stop bar 16 or 17 is displaced to the left as viewed in FIGS. 2 and 2*a* whereby switch 53 is closed which controls a motor rotating drive means 22 and 23. When the respective stop bar 16 or 17 is again released by movement of the respective control member 13 to its releasing position shown in FIGURE 1, the respective stop bar 16 or 17 returns to its normal position under the action of spring means, and disconnects the electric motor so that drive means 22 and 23 stop. The switch 53 controlled by stop bars 16 and 17 returns to its initial position may also operate electro-magnetic clutch means connecting drive means 22 and 23 with a drive shaft. Such clutch means is again released by the opened switch 53 when the respective control bar 16 or 17 returns to its initial position. Consequently, each drive member 22 or 23 performs a number of revolutions corresponding to the digit counted by the respective counter means 5, 6. In the third decimal order of the multiplier, drive member 23 will perform three revolutions until it is disconnected.

As explained above, at the moment in which lug 6*a* of the third order counter means actuates transfer means 19, control member 13 returns to the position shown in FIGURE 1, and the counter mechanism moves to the left until control member 13 of the second order engages stop 17*a*. Control member 13 of the second order is raised, as shown in FIGURE 3 since a digit greater than the median digit 5 was introduced into the second order. Consequently projection 13*a* is located at the level of stop means 17*a* which is associated with subtraction, and the counter mechanism is stopped in a position associated with subtraction in which the drive member 22 is located opposite the counter gear 5 of the second order, and meshes with the same. Drive member 22 turns in counterclockwise direction, and consequently turns counter means 5, 6 of the second order in forward clockwise direction as indicated by arrow 5*a* until lug 6*a* engages end portion 19*a* of the respective transfer member 19. Since the digit 8 was registered in the counter means of the second order, only two steps are necessary until transfer member 19 is shifted by lug 6*a* and shifts control member 13 of the second order to its releasing position so that the counter mechanism moves on. Drive member 22 is stopped, and the counter means of the second order also stops after having counted two steps corresponding to complement number of the number representing in the second order. Consequently the totalizer in which the product is formed will perform two subtractive operations in the second order, as desired for a shortened multiplication.

If the counter means of the first order would have registered a digit greater than the median digit, the control member 11 of the first order would have displaced the transfer member 19 of the second order to a transfer position in which the lug 6*a* of the second order moving in forward direction as indicated by arrow 5*a* would have engaged projection 19*a* shifted one step in the direction of arrow 5*b* one step earlier, so that only a single step would have been counted. In this event, however, a subtraction operation would have been carried out in the first decimal order.

In the present example, however, the digit 1 was stored in the first order, and consequently two subtractive steps were counted in the second order. In the first order counter means 5, 6 is displaced one step in direction of arrow 5*a* according to the digit 1, and is turned by counter means 23 in the counterclockwise return direction of arrow 5*b* a single step until lug 6*a* engages in zero position in the transfer means 19 of the first order to shift control member 13 of the first order to releasing position. As mentioned above, the transfer means 19 of the first order is supported on the stationary pin 20 on the slide 50, since it is never displaced to a transfer position.

Assuming a multiplier 81, the transfer means 19, **19*a* of the third order will be shifted to its transfer position shown in FIG. 3 under control of the control means 11, 13 of the second order. Irrespective of the fact that the counter means 5, 6 of the third order remains in zero position since no number was introduced into the same, drive member 23** will turn the counter means of the third order one step from zero position in the return direction of arrow *5b* until lug *6a* engages projection **19*a* of the respective associated transfer member 19 and shifts the same to effect release of the mechanism 100** for movement from the third order position to the second order position.

After the lowest order has been counted, and the respective control member 13 has released stop means **16*a* or 17*a*, the mechanism 100 and supporting slide 50** move further to the left as viewed in FIGURE 2, and during such movement the slide may actuate a printing device for printing the product registered in the totalizer.

After the multiplication has been completed, the clearing means shown in FIGURE 4 are actuated to clear all counter means and control means so that the elements return to the zero position illustrated in FIGURE 1. Projection **24*b* on the clearing lever 24 passes between two teeth of gear 8, and locks the same against turning movement in an exactly determined position. After the clearing operation, clearing levers 24 are again returned to the position shown in FIGURE 4 in which gears 5 and 8 and cam 9 are freely turnable. At the same time, the slide 50 and mechanism 100** are returned to the right as viewed in FIGURE 2 to the initial position.

Since it is not necessary to operate the control members 13 during a division, the locking bar 18 is moved to the left as viewed in FIGURE 1 to lock all control members 13 in the inoperative position shown in FIGURE 1. In the illustrated and described embodiment of the present invention, the mechanism 100 is mounted on a slide 50 which is movable in the machine frame 51 between a series of pairs of denominational positions, respectively associated with addition and subtraction. However, it is also possible to provide a stationary mechanism, and to move the stop bars 16 and 17 together with the drive members 22 and 23 between a series of denominational positions. In this event, the register storing the multiplicand is also movable with members 16, 17, 22 and 23.

In the illustrated embodiment, a subtractive operation is performed in any denominational order in which the respective introduced digit is between 6 and 9. Evidently, it is also possible to effect subtractive operations for all digits between five and nine. In any event, the transfer operations are effected if a registered digit exceeds a selected median digit.

In a modified embodiment of the present invention, the gear 8 is omitted, and cam 9 is directly connected to counter gear 5 and actuating member 6 for rotation. Also, transfer member 19 may be mounted on the same pin which supports control member 13 for turning movement on control member 11.

The present invention has the particular advantage over the prior art that wherever a transfer is required, the transfer member is shifted, and not the counter gear, so that an undesired movement of the counter gear beyond the correct position is impossible.

It will be understood that each of the elements described above, or two or more together, may also find a useful application in other types of calculating apparatus differing from the types described above.

While the invention has been illustrated and described as embodied in a mechanism for short-cutmultiplication, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a short-cut multiplying mechanism, in combination, a denominational series of digital counter means turnable between a plurality of digital positions and adapted to be turned by input means in a forward direction from a zero position to digital positions representing introduced multiplier digits and adapted to be turned from said digital position for counting the number of steps between said digital position and the final position thereof; and a denominational series of control and transfer means respectively engaged and controlled by the counter means to stop the counting movement of the counter means of the respective order in said zero position, or in a transfer position following said zero position in a direction opposite to said forward direction, respectively, when the respective control and transfer means is in a position representing a lower digit, or a higher digit, respectively, with reference to a selected median digit; and means controlled by the counter means of each order and operatively connected to the control and transfer means of the respective next higher order to shift the same between said positions for representing a lower digit or a higher digit registered in the respective counter means of the next lower order so that the introduced digit augmented by a unit is counted in any order whose next lower order represents a digit greater than the median digit.

2. Counter mechanism as set forth in claim 1 and including clearing means movable to a clearing position engaging the counter means associated with denominational orders above the lowest order for moving said counter means to said zero position.

3. In a short-cut multiplying mechanism, in a combination, a denominational series of digital counter means turnable between a plurality of digital positions and adapted to be turned by input means in a forward direction from a zero position to digital positions representing introduced multiplier digits and adapted to be turned from said digital position in a forward direction or in an opposite return direction for counting the number of steps between said digital position and the final positions thereof, each counter means having an actuating portion; a denominational series of transfer means, each transfer means including a transfer member movable in the circumferential direction of the associated counter means between a normal position and a transfer position and being located in said normal position opposite said actuating portion the respective counter means in zero position and being in said transfer position located opposite said actuating portion of said counter means in a position following said zero position in direction of said return movement, each transfer member being also movable in a direction transverse to said tangential direction from said normal and transfer positions to either of two inactive positions for terminating movement of said counter means and being shifted by said actuating portion of the associated counter means to one of said stop positions when said actuating portion of said counter means passes through a position thereof located opposite the respective transfer means in normal position or transfer position; a denominational series of control means, each control means including a first control member connected to the transfer member of the next higher order and controlled by the associated counter means of the adjacent lower order to move to a control position for moving the respective transfer member to said transfer position when the respective controlling counter means of the adjacent lower order is in a position associated with a digit greater than the median digit, each control means including a second control member connected to said first control member and being moved by the same from a normal addition position to a subtraction position when the same moves to said control position; and drive means controlled by said second control member in said subtraction position to turn the respective counter means in said forward direction until said actuating portion shifts said transfer member to one of said inactive positions whereby a complement number of steps is counter in orders in which a digit greater than the median digit was introduced, said drive means being controlled by said second control member in said addition position to turn said counter means in said return direction until said actuating portion shifts said transfer member to the other of said inactive positions whereby an additional step is counted when said transfer member is in said transfer position.

4. In a short-cut multiplying mechanism, in combination, two supporting elements, one of said elements tending to move relative to the other element between a series of pairs of denominational positions, one position of each pair being associated with addition and the other position associated with subtraction; a denominational series of digital counter means turnably mounted on one of said elements for movement between a plurality of digital positions and adapted to be turned by input means in a forward direction from a zero position to digital positions for representing an introduced multiplier digit, each counter means including an actuating member turning therewith; a denominational series of transfer means mounted on one of said elements, each transfer means including a transfer member movable in circumferential direction of the associated counter means between a normal position and a transfer position and being located in said normal position opposite said actuating member of the respective counter means in zero position and being in said transfer position located in a position following said zero position in direction of a return movement opposite to said forward movement, each transfer member being also movable in a transverse direction and being shifted by said actuating member of the associated counter means when the respective actuating member reaches a position located opposite the respective transfer means in normal or transfer position; a denominational series of control means mounted on said one supporting element, each control means being connected to the transfer member of the next higher order and controlled by the associated counter means of the adjacent lower order to move from a normal addition position to a subtraction position for moving the respective higher order transfer member to said transfer position when the respective controlling counter means of the adjacent lower order is in a position associated with a digit greater than the median digit, each control means being movable between a first position engaging said other supporting element to stop said movable supporting element in said subtraction position thereof when said control means is in said subtraction position thereof, and to stop said movable supporting element in said addition position thereof when said control means is in said addition position thereof, and a second releasing position in which said movable element continues its movement, each control means being engaged by the associated transfer member and moving to said second position when the same is shifted in transverse direction, first and second rotary drive members mounted on said other supporting element for turning movement in opposite directions, said first drive member driving a counter means when said movable element is in one of said addition positions thereof, and said second drive member driving the counter means when said movable element is in the respective subtraction position, said first drive member turning said counter means in said return direction whereby an additional step is counted when said transfer member is in said transfer position, and said second drive member turning said counter means in said forward direction until said actuating member transversely shifts said transfer member whereby a complement number of steps is counted in orders in which a digit greater than the median digit was introduced and whereby a complement number of steps less one is counted when said transfer member is in said transfer position.

5. In a short-cut multiplying mechanism, in combination, two supporting elements, one of said elements tending to move relative to the other element between a series of pairs of denominational positions, one position of each pair being associated with addition and the other position associated with subtraction; a denominational series of digital counter means turnably mounted on one of said elements for movement between a plurality of digital positions and adapted to be turned by input means in a forward direction from a zero position to digital positions for representing an introduced multiplier digit, each counter means including an actuating member turning therewith; a denominational series of transfer means mounted on one of said elements, each transfer means including a transfer member movable in circumferential direction tangential of the associated counter means between a normal position and a transfer position and being located in said normal position opposite said actuating member of the respective counter means in zero position and being in said transfer position located in a position following said zero position in direction of a return movement opposite to said forward movement, each transfer member being also movable in a direction transverse to said tangential direction between a first position and a second position and being shifted by said actuating member of the associated counter means from said first to said second position when the respective actuating member reaches a position located opposite the respective transfer means in normal or transfer position; a denominational series of control means mounted on said one supporting element, each control means including a first control member connected to the transfer member of the next higher order and controlled by the associated counter means of the adjacent lower order to move from a normal position to a control position for moving the respective higher order transfer member to said transfer position when the respective controlling counter means of the adjacent lower order is in a position associated with a digit greater than the median digit, each control means including a second control member mounted on said first control member and being in an addition position when the same is in said normal position and being in a subtraction position when the same is in said control position, each second control member being movable on said first control member between a first position engaging said other supporting element to stop said movable supporting element in said subtraction position thereof when said second control member is in said subtraction position thereof, and to stop said movable supporting element in said addition position thereof when said second control member is in said addition position thereof, and a second releasing position in which said movable element continues its movement, each second control member being spring-loaded to move to said first position and being engaged by the associated transfer member and held by the same in said second position when the same is in said second position thereof; first and second rotary drive members mounted on said other supporting element for turning movement in opposite directions, said first drive member driving a counter means when said movable element is in one of said addition positions thereof, and said second drive member driving the counter means when said movable element is in the respective subtraction position, said first drive member turning said counter means in said return direction whereby an additional step is counted when said transfer member is in said transfer position, and said second drive member turning said counter means in said forward direction until said actuating member shifts said transfer member to said second position whereby a complement number of steps is counted in orders in which a digit greater than the median digit was introduced and whereby a complement number of steps less one is counted when said transfer member is in said transfer position.

6. In a short-cut multiplying mechanism, in combination, a supporting element; a slide tending to move relative to said supporting element between a series of pairs of denominational positions, one position of each pair being associated with addition and the other position associated with subtraction; a denominational series of digital counter means turnably mounted on said slide for movement between a plurality of digital positions and adapted to be turned by input means in a forward direction from a zero position to digital positions for representing an introduced multiplier digit, each counter means including an actuating member turning therewith; a denominational series of transfer means mounted on said slide, each transfer means including a transfer member movable in a circumferential direction of the associated counter means between a normal position and a transfer position and being located in said normal position opposite said actuating member of the respective counter means in zero position and being in said transfer position located in a position following said zero position in direction of a return movement opposite to said forward movement, each transfer being also movable in a direction transverse to said tangential direction between a first position and a second position and being shifted by said actuating member of the associated counter means from said first to said second position when the respective actuating member reaches a position located opposite the respective transfer means in normal or transfer position; a denominational series of control means mounted on said slide, each control means being connected to the transfer member of the next higher order and controlled by associated counter means of the adjacent lower order to move from a normal addition position to a subtraction position for moving the respective higher orders transfer member to said transfer position when the respective controlling counter means is in a position associated with a digit greater than the median digit, each control means being movable between the first position engaging said supporting element to stop said slide in said subtraction position thereof when said control means is in said subtraction position thereof, and to stop said slide in said addition position thereof when said control means is in said addition position thereof, and a second releasing position in which said slide continues its movement, each control means being spring-loaded to move to said first position and being engaged by the associated transfer member and held by the same in said second position when the same is in said second position thereof; first and second rotary drive members mounted on said supporting element for turning movement in opposite directions, said first drive member driving a counter means when said slide is in one of said addition positions thereof, and said second drive member driving the counter means when said slide is in the respective subtraction position, said first drive member turning said counter means in said return direction whereby an additional step is counted when said transfer member is in said transfer position, and said second drive member turning said counter means in said forward direction until said actuating member shifts said transfer member to said second position whereby a complement number of steps is counted in orders in which a digit greater than the median digit was introduced and whereby a complement number of steps less one is counted when said transfer member is in said transfer position.

7. A counter mechanism as set forth in claim 6 including two stop members mounted on said supporting element, said stop members having stop portions staggered in the direction of movement of said slide and respectively engaging said control means in said subtraction position and an addition position of said slide when said control means is in said first position, said stop portions being spaced from each other the distance of movement of said control means from said addition position to said subtraction position.

8. A counter mechanism as set forth in claim 7 wherein each of said step members is movable between a normal position and an operative position and is shifted to said operative position when engaged by said control means; operating means for said first and second drive members controlled by said stop members to actuate said drive members when said control means move one of said stop members to said operative position, and to terminate rotation of said drive members when said control means move to said second releasing position and the respective stop member returns to its normal position.

9. In a short-cut multiplying mechanism in combination, a denominational series of digital counter means turnable between a plurality of digital positions and adapted to be turned by input means in a forward direction from a zero position to digital positions representing introduced multiplier digits and adapted to be turned from said digital position in said forward or in an opposite return direction for counting the number of steps between said digital position and the final position thereof; a denominational series of control and transfer means respectively engaged and controlled by the counter means to stop the counting movement of the counter means of the respective order in said zero position, or in a transfer position following said zero position in said return direction, respectively, when the respective control and transfer means is in a position representing a lower digit, or a higher digit, respectively, with reference to a selected median digit so that the introduced digit augmented by a unit is counted in any order whose next lower order represents a digit greater than the median digit; and cam means controlled by the counter means of each order and operatively connected to the control and transfer means of the respective next higher order to shift the same between said positions for representing a lower digit or a higher digit registered in the respective counter means of the next lower order; and means for turning said counter means in said forward and return directions and being controlled by said control and transfer means to turn said counter means in said forward direction when the respective control and transfer means represents an introduced digit greater than the median digit so that a complement number of steps is counted, said drive means being controlled by said control and transfer means to turn in said return direction each counter means cooperating with a control and transfer means by which a lower digit is represented.

10. In a short-cut multiplying mechanism, in combination, a denominational series of digital counter means movable between a plurality of digital positions and adapted to be moved by input means in a forward direction from a zero position to digital positions representing introduced multiplier digits and adapted to be moved from said digital position for counting the number of steps between said digital position and the final position thereof, each counter means having an actuating portion; a denominational series of transfer means, each transfer means being movable between a normal position and a transfer position, each transfer means in said normal position being located opposite said actuating portion in said zero position of the respective counter means and being in said transfer position located opposite said actuating portion in the position of the respective counter means following said zero position in the opposite direction of movement, each transfer means being also movable in a direction transverse to said direction of movement of said counter means from said normal and transfer positions to either of two inactive positions for terminating movement of said counter means and being shifted by the associated counter means to one of said stop positions when said actuating portion of the respective counter means passes through a position thereof located opposite the respective transfer means in normal position or transfer position; and a denominational series of control means respectively connected to the transfer means controlling the next higher order and being controlled by the associated counter means of the adjacent lower order to move the respective next higher order transfer means to said transfer position when the respective controlling counter means of the adjacent lower order is in a position associated with a digit greater than the median digit whereby during turning movement of each counter means a transfer step is counted by said counter means before the respective transfer means is shifted to one of said inactive positions if a digit greater than the median digit is introduced into the respective next lower order.

11. Counter mechanism as set forth in claim 10 and including a support supporting the control means associated with the lowest denominational order for transverse movement to said stop positions only so that the respective control means is not movable between said normal position and transfer position.

12. In a short-cut multiplying mechanism, in combination, a denominational series of digital counter means turnable between a plurality of digital positions and adapted to be turned by input means in a forward direction from a zero position to digital positions representing introduced multiplier digits, and adapted to be turned from said digital position for counting the number of steps between said digital position and the final position thereof, each counter means having an actuating portion; a denominational series of transfer means, each transfer means being movable in the circumferential direction of the associated counter means between a normal position and a transfer position, each transfer means in said normal position being located opposite said actuating position in said zero position of the respective counter means and being in said transfer position located opposite said actuating position in the position of the respective counter means following said zero position in the opposite direction of movement, each transfer means being also movable in a direction transverse to said direction of movement of said counter means from said normal and transfer positions to either of two inactive positions for terminating return movement of said counter means and being shifted by the associated counter means to one of said stop positions when said actuating portion of the respective counter means passes through a position thereof located opposite the respective transfer means in normal position or transfer position; and a denominational series of control means, each control means including a cam follower member connected to the transfer means controlling the next higher order, and a cam means connected to the counter means of the respective associated lower order for turning movement therewith and engaging said cam follower member, said cam means including a cam portion associated with the digits greater than the median digit so that each control means is controlled to move the respective next higher order transfer means to said transfer position when the respective controlling lower order counter means is in a position associated with a digit greater than the median digit whereby during turning movement of each counter means a transfer step is counted by said counter means before the respective counter transfer means is shifted to one of said inactive positions if a digit greater than the median digit is introduced into the respective next lower order.

13. In a short-cut multiplying mechanism, in combination, a denominational series of digital counter means turnable between a plurality of digital positions and adapted to be turned by input means in a forward direction from a zero position to digital positions representing introduced multiplier digits and adapted to be turned from said digital position in forward direction or in an opposite return direction for counting the number of steps between said digital position and the final position thereof, each counter means having an actuating portion; a denominational series of transfer means, each transfer means including a transfer member movable in the circumferential direction of the associated counter means between a normal position and a transfer position and being located in said normal position opposite said actuating portion of the respective counter means in zero position and being in said transfer position located opposite said actuating portion of said counter means in a position following said zero position in direction of said return movement, each transfer member being also movable in a direction transverse to said tangential direction from said normal and transfer positions to either of two inactive positions for terminating movement of said counter means and being shifted by said actuating portion of the associated counter means to one of said stop positions when said actuating portion of the respective actuating portion of said counter means passes through a position thereof located opposite the respective transfer means in normal position or transfer position; and a denominational series of control means respectively connected to the transfer means controlling next higher order and being controlled by the associated counter means of the adjacent lower order to move the respective next higher order transfer means to said transfer position when the respective controlling counter means of the adjacent lower order is in a position associated with a digit greater than the median digit whereby during turning movement of each counter means a transfer step is counted by said counter means before the respective transfer means is shifted to one of said inactive positions if the digit greater than the median digit is introduced into the respective next lower order.

14. In a short-cut multiplying mechanism, in combination, a denominational series of digital counter means, each counter means including a first gear having an actuating lug thereon and being movable between a plurality of digital positions and adapted to be moved by input means in a forward direction from a zero position to digital positions representing introduced multiplier digits, and adapted to be moved from said digital position for counting the number of steps between said digital position and the final position thereof; a denominational series of transfer means, each transfer means being movable between a normal position and a transfer position, each transfer means in said normal position being located opposite said actuating lug in said zero position of the respective counter means and being in said transfer position located opposite the position of said lug following said zero position in the opposite direction of movement, each transfer means being also movable in a direction transverse to said direction of movement of said counter means from said normal and transfer positions to either of two inactive positions for terminating movement of said counter means to one of said inactive positions when the respective lug passes through a position thereof located opposite the respective transfer means in normal position or transfer position; and a denominational series of control means respectively connected to the transfer means of the next higher order, each control means including a second gear meshing with said first gear of the respective counter means, a cam means secured to said second gear, and a cam follower member cooperating with said cam means and connected to and controlling the respective next higher order transfer means to move the same to said transfer position when the respective controlling counter means of the adjacent lower order is in a position associated with a digit greater than the median digit whereby during turning movement of each counter means a transfer step is counted by the same before the respective transfer means is shifted to one of said inactive positions if a digit greater than the median digit is introduced into the respective next lower order.

References Cited in the file of this patent

UNITED STATES PATENTS

| | | |
|---|---|---|
| 2,170,406 | Hamann | Aug. 22, 1939 |
| 2,611,539 | Tourell | Sept. 23, 1952 |
| 2,886,238 | Plunkett | May 12, 1959 |